United States Patent
Sturt et al.

[11] Patent Number: 6,099,072
[45] Date of Patent: Aug. 8, 2000

[54] FLOOR MOUNTING SYSTEM FOR A COLLAPSIBLE VEHICLE SEAT

[75] Inventors: Alan Sturt, West Bloomfield; Marcel C. Ban, Troy; Iris Drew, Berkley, all of Mich.

[73] Assignee: Lear Corporation, Southfield, Mich.

[21] Appl. No.: 09/250,702

[22] Filed: Feb. 16, 1999

Related U.S. Application Data

[63] Continuation-in-part of application No. 08/950,558, Oct. 15, 1997, Pat. No. 5,941,602.
[60] Provisional application No. 60/074,802, Feb. 16, 1998.

[51] Int. Cl.[7] ........................................... A47C 9/06
[52] U.S. Cl. ..................... 297/15; 297/341; 296/65.09
[58] Field of Search ............................ 297/340, 341, 297/378.1, 378.12, 15, 248, 257, 322, 324, 325, 326, 327; 296/65.01, 65.09, 66, 69

[56] References Cited

U.S. PATENT DOCUMENTS

| | | |
|---|---|---|
| 2,620,020 | 12/1952 | Austin . |
| 3,151,906 | 10/1964 | Roberts . |
| 3,746,389 | 7/1973 | Fourrey . |
| 3,784,252 | 1/1974 | Peterson . |
| 4,341,415 | 7/1982 | Braun et al. . |
| 4,957,321 | 9/1990 | Martin et al. . |
| 4,969,682 | 11/1990 | Gray . |
| 4,986,591 | 1/1991 | Martienssen et al. . |
| 5,116,097 | 5/1992 | Bulgari . |
| 5,145,232 | 9/1992 | Dal Monte . |
| 5,165,753 | 11/1992 | Henderson . |
| 5,397,167 | 3/1995 | Fourrey et al. . |
| 5,454,624 | 10/1995 | Anglade et al. . |
| 5,482,346 | 1/1996 | Lesourd . |
| 5,492,386 | 2/1996 | Callum . |
| 5,527,087 | 6/1996 | Takeda et al. . |
| 5,588,707 | 12/1996 | Bolsworth et al. . |
| 5,611,589 | 3/1997 | Fujii et al. . |
| 5,636,884 | 6/1997 | Ladetto et al. . |
| 5,733,005 | 3/1998 | Aufrere et al. . |
| 5,839,773 | 11/1998 | Ban et al. . |

*Primary Examiner*—Milton Nelson, Jr.
*Attorney, Agent, or Firm*—Brooks & Kushman P.C.

[57] ABSTRACT

A seat assembly for a passenger compartment of an automotive vehicle including a seat back portion pivotally mounted on a lower seat portion. The lower seat portion has a frame that forms the base of a parallelogram linkage riser for the lower seat portion. A seat back panel for the seal back portion is supported by a parallelogram linkage secured to a seat back frame. The riser and the seat back portion linkages are lowered as the seat back portion is folded forward. A mounting bracket is secured to a seat track that forms a part of the floor pan of the passenger compartment including rollers for permitting adjustment of the seat assembly along the seat track. Adjustable legs at the forward margin of the lower seat portion permit the seat assembly to be lowered and stored in a foot well area of the floor pan structure as the legs are moved to a collapsed position and as the seat assembly moves forward in the seat track.

7 Claims, 8 Drawing Sheets

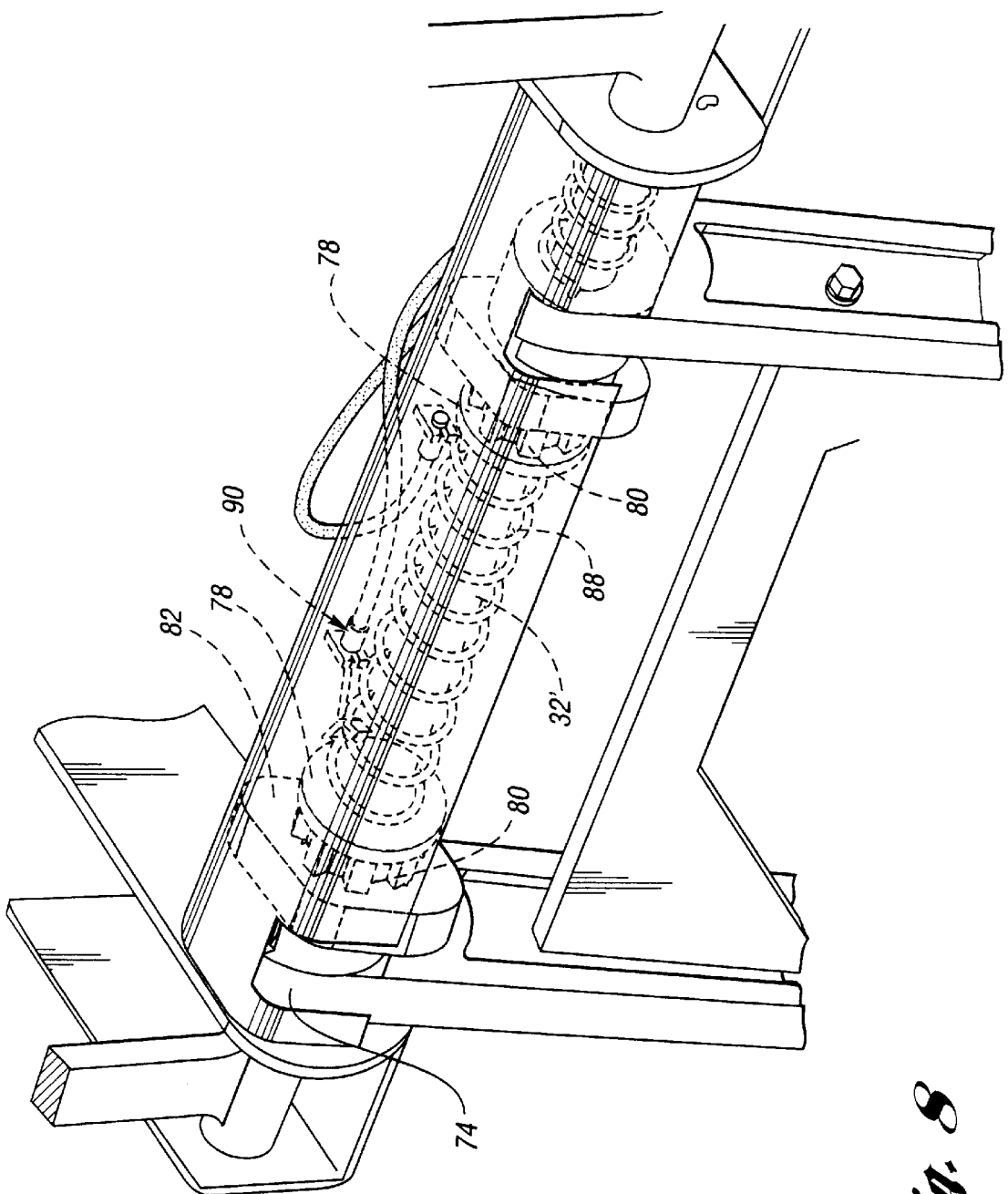

FLOOR MOUNTING SYSTEM FOR A COLLAPSIBLE VEHICLE SEAT

REFERENCE TO RELATED APPLICATION

This application is based on Provisional Application Serial No. 60/074,802, filed Feb. 16, 1998; which is a continuation-in-part of application Ser. No. 08/950,558, filed Oct. 15, 1997, now U.S. Pat. No. 5,941,602 and which is assigned to the assignee of the present invention.

TECHNICAL FIELD

This invention relates to seat assemblies for rear passengers in an automotive vehicle.

BACKGROUND OF THE INVENTION

Rear seat assemblies for contemporary minivan vehicles and so-called sport utility vehicles typically are provided with collapsible frames that permit the seat assembly to be mounted in an upright position for purposes of supporting rear passengers and for permitting the seat assembly to be collapsed in a forward direction so that the vehicle passenger compartment can be adapted for carrying cargo. Such seat assemblies require the seat back portion of the seat assembly to be tilted forward over the lower seat portion. The stacked height of the seat assembly in its folded state then would be equal to the sum of the height of the seat riser, the height of the lower seat portion, and the thickness of the seat back portion. Thus, the overall stacked height for such prior art designs is substantial. This may provide an inconvenience to passengers during ingress and egress through a side door opening. Furthermore, it reduces the cargo carrying capacity of the vehicle when the vehicle is adapted for carrying cargo.

BRIEF DESCRIPTION OF THE INVENTION

The present invention makes it possible to increase the cargo carrying capacity of a forward seat assembly in an automotive vehicle passenger compartment of the type described in the background discussion. This is accomplished by designing the riser assembly for the lower seat portion of the seat assembly in the form of a parallelogram linkage. The seat back portion is pivoted on the frame for the lower seat portion so that it can be folded forward over the lower seat portion. As this is done, the parallelogram linkage moves to its collapsed state, thereby reducing the height of the riser assembly for the lower seat portion. For a particular description of the parallelogram linkage for the lower seat portion and for a description of the pivotal connection between the frame of the lower seat portion and the frame for the seat back portion, reference may be made to application Ser. No. 08/950,558. The disclosure of that application is incorporated herein by reference.

The lower seat portion, when it is in its collapsed state, allows the upright seat back portion to be folded forward, thereby providing a minimum stacked height for the seat assembly.

In accordance with an object of the present invention, a lower parallelogram member of the riser assembly for the lower seat portion is supported on a mounting bracket which in turn carries mounting rollers that are received in a seat track formed in the passenger compartment floor pan structure. The seat track follows the contour of the floor pan structure so that its forward end is received in the foot well of the floor pan structure. As the seat back is folded and as the riser assembly is collapsed, the seat assembly may be moved forward, thereby allowing the mounting rollers for the seat assembly to the guided through the seat track toward the foot well. The seat assembly thus may be moved into the foot well as the mounting bracket for the lower seat portion is guided forward through the mounting track.

The forward portion of the lower parallelogram member of the riser assembly for the lower seat portion is secured to the floor pan structure by adjustable legs. When the parallelogram linkage is moved forward toward the foot well, the effective length of the adjustable legs at the forward margin of the lower seat portion can be reduced as the legs pivot about the connection with the floor pan structure.

In accordance with a further objective of the present invention, the adjustable legs for the forward margin of the lower seat portion may include a friction lock situated between telescoping leg members wherein provision is made for releasing the lock when the seat assembly is moved toward the foot well, thereby permitting the adjustable legs to collapse to a reduced overall axial length.

According to a still further objective of the invention, each adjustable leg may comprise telescoping screw thread members wherein a threaded portion of the adjustable leg is driven by an electric motor so that it rotates about the common axis of the telescoping members of the adjustable leg. The motor and the screw adjustment elements of the adjustable leg thus would replace the function of the friction lock elements discussed above.

According to a still further objective of the invention, the adjustable legs that support the forward margin of the lower seat portion may be folded under the lower seat portion when the seat assembly is moved along the seat track in the floor pan structure, thereby permitting the seat assembly to be stowed in the foot well when the lower seat portion and the seat back portion are in their stacked positions.

BRIEF DESCRIPTION OF THE FIGURES OF THE DRAWINGS

FIG. 8 is an isometric assembly view showing the means for securing the upper end of the legs of the embodiment of FIG. 5 to the forward margin of the seat assembly.

PARTICULAR DESCRIPTION OF THE INVENTION

Figure 1:
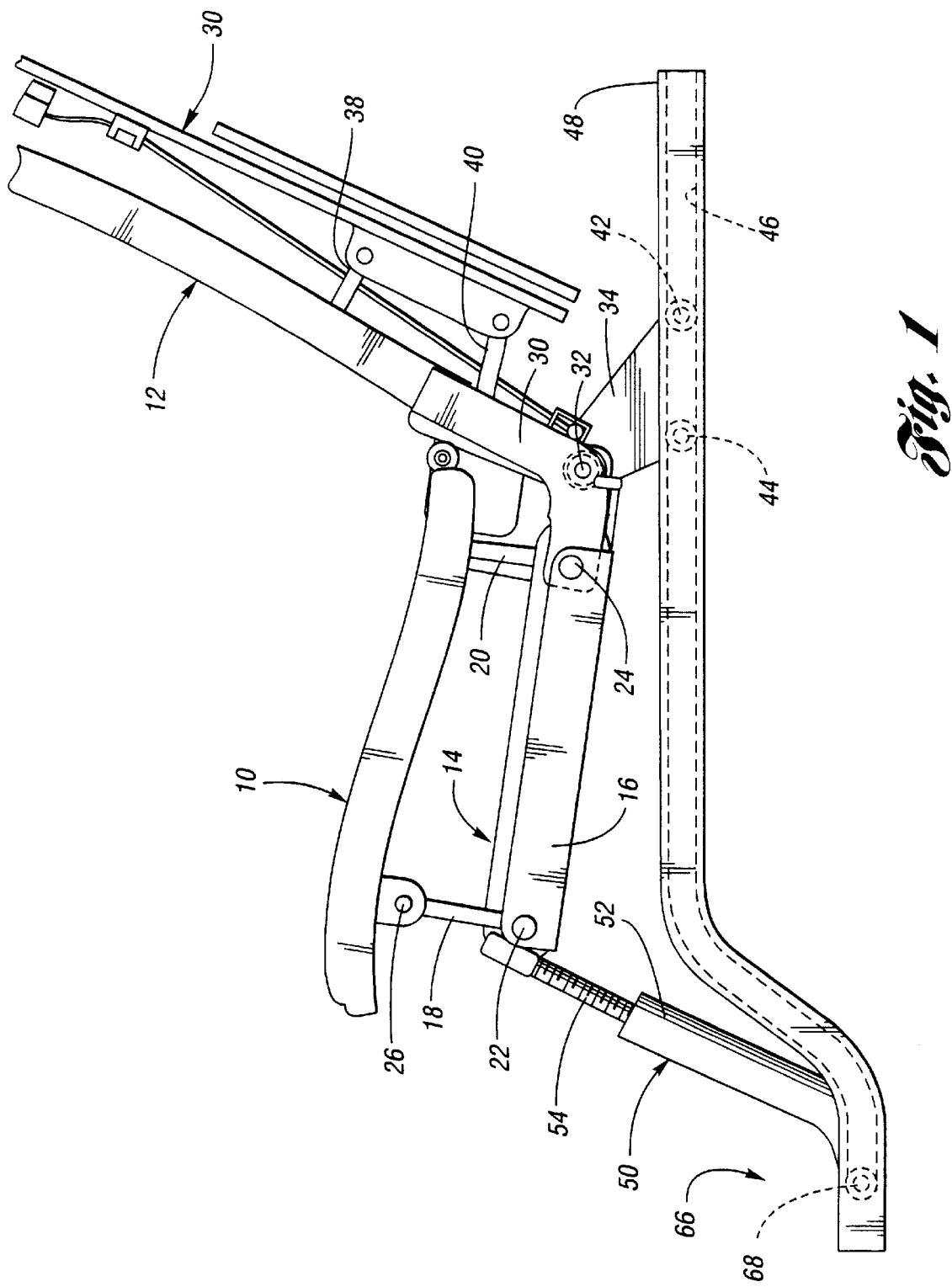
FIG. 1 is a schematic representation of a seat assembly having a parallelogram linkage riser that supports the lower seat portion and adjustable legs at the forward margin of the seat assembly.

Shown in FIG. 1 in schematic form is an adjustable rear seat assembly that comprises a lower seat portion 10 and a seat back portion 12. The lower seat portion 10 has a parallelogram linkage riser assembly generally indicated at 14. The riser assembly comprises a lower structural channel member 16 and two fore-and-aft side linkage members 18 and 20. Member 20 is pivoted on a hinge pin 22 to the forward end of the lower member 16. Likewise, the parallelogram side member 20 is pinned by a hinge pin 24 to the rearward end of the lower member 16.

The upper end of each of the fore-and-aft linkage members 18 and 20 are connected by pivotal connections 26 and 28 to the forward margin of the supporting frame for the lower seat portion 10.

The rearward margin of the parallelogram linkage riser assembly is supported by bracket 30, which is pivoted at 32 to a mounting bracket 34 for the seat assembly.

A rear panel 36 for the seat back portion 12 is connected to a seat back structural frame by linkage elements 38 and 40, which permit the panel to be collapsed toward the frame of the seat back portion 12 when the seat back portion 12 is tilted forward about the pivot 32. The articulating action of the seat back portion 12 and the lower seat portion 10, as the seat assembly is moved to its collapsed position, has been described in application Ser. No. 08/950,558.

The bracket 34 on which the rearward margin of the lower seat portion is pivoted carries rotatably a pair of rollers 42 and 44. These rollers are received in a track opening in a track structure 48 extending in a fore-and-aft direction. The track structure is formed in the vehicle floor pan structure.

The forward margin of the seat assembly is supported by an adjustable leg 50 which has telescoping members 52 and 54. The outward end of the member 54 is pinned to the forward end of the lower parallelogram linkage member 16.

The position of the telescopic member 54 relative to the telescopic member 52 can be adjusted manually by a conventional friction lock mechanism. The friction lock mechanism can be released to permit relative motion of the members 52 and 54.

Figure 2:
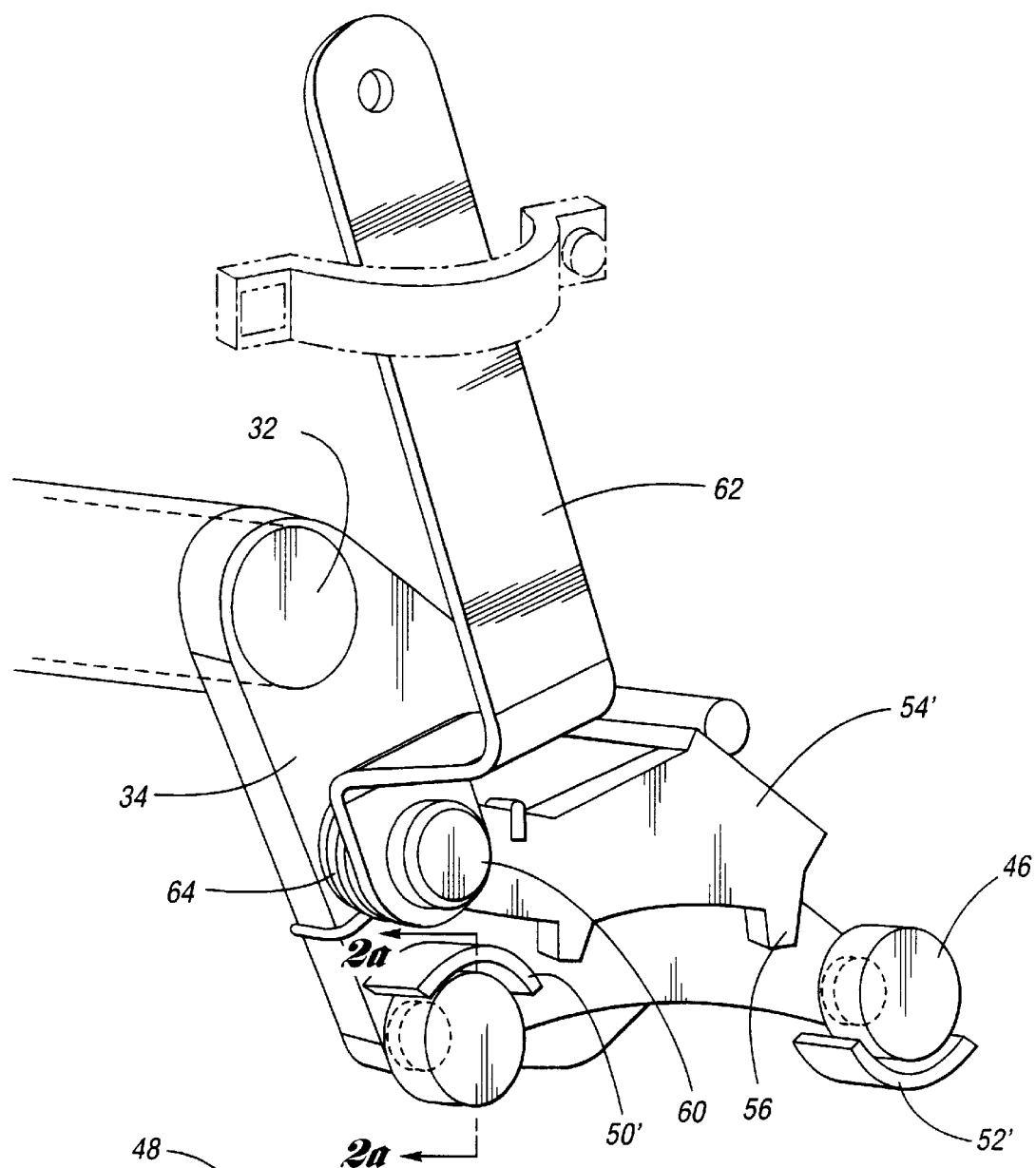
FIG. 2 is a schematic, isometric, subassembly view of the mounting bracket for securing the rearward margin of the lower seat portion of the seat assembly to the seat track in the floor pan structure including seat adjusting rollers.
Figure 2A:
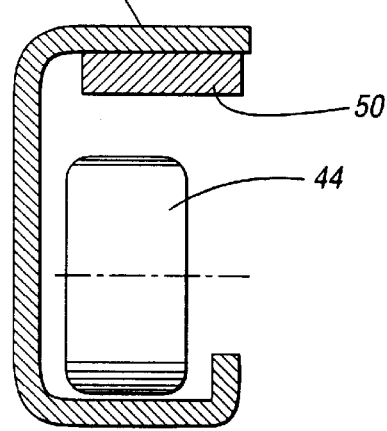
FIG. 2a is a cross-sectional view taken along the plane of section line 2a—2a of FIG. 2.

FIG. 2 shows the details of the adjustable bracket 34 and the rollers 44 and 46. FIG. 2a shows the track 48, which is in the form of an open channel. Roller 44 is positioned in the open channel of the track 48.

A spacer 50' carried by the bracket 34 is situated between the upper part of the track 48 and the roller 44. It is arcuate in shape, as indicated in FIG. 2, and it partially surrounds the roller 44. It reduces the tendency of the seat assembly to rattle and vibrate when the seat assembly is mounted in the seat track.

Roller 46 has a corresponding spacer 52. The lower part of the roller 44 engages one side of the track 48 and the upper end of the roller 46 engages the other side of the open channel of the track 48.

Figure 3:
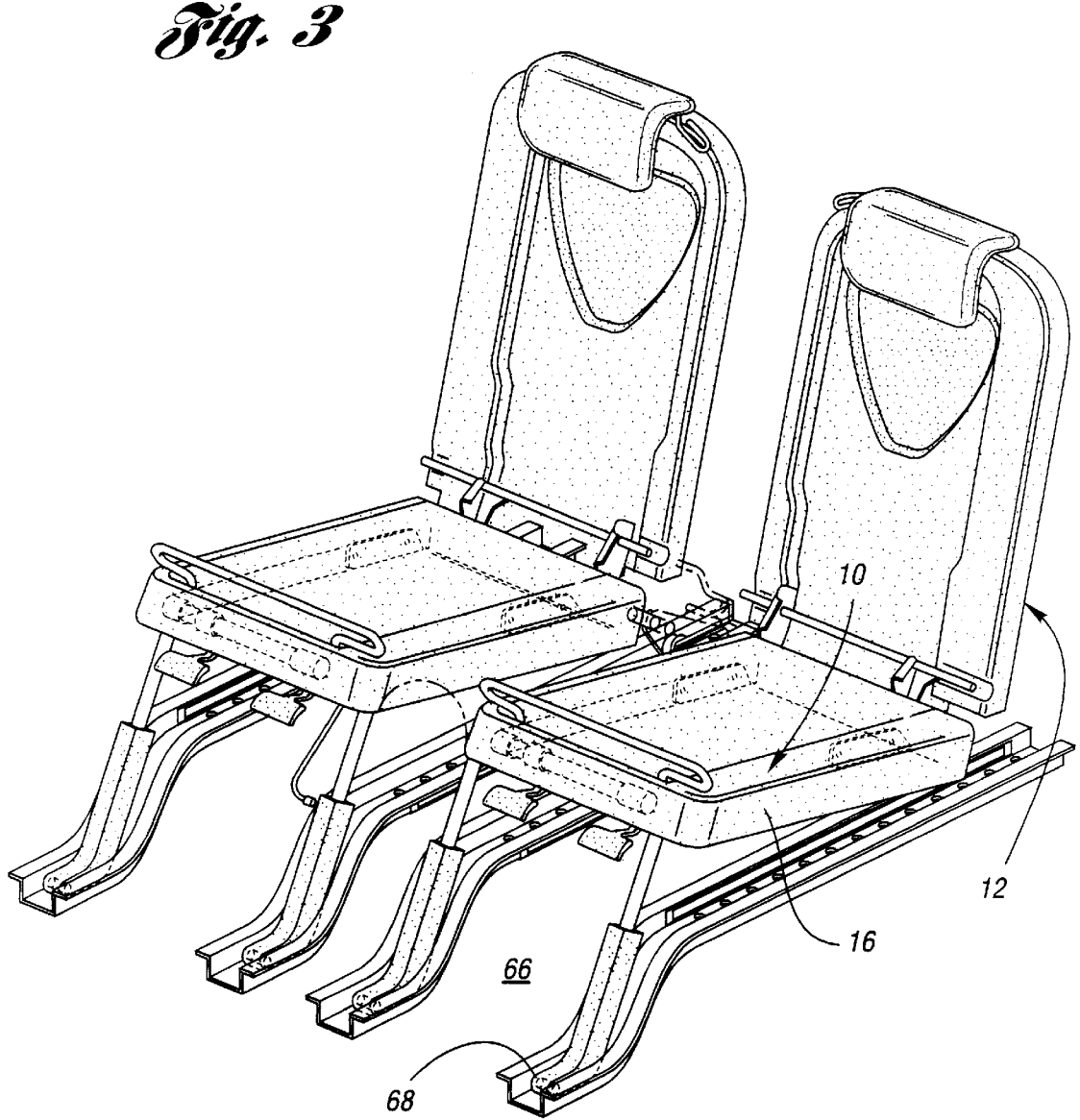
FIG. 3 is an isometric assembly view of a pair of seat assemblies as schematically illustrated in FIG. 1, the seat assemblies of the pair of FIG. 3 being located side-by-side at a rearward location in the vehicle passenger compartment.
Figure 4:
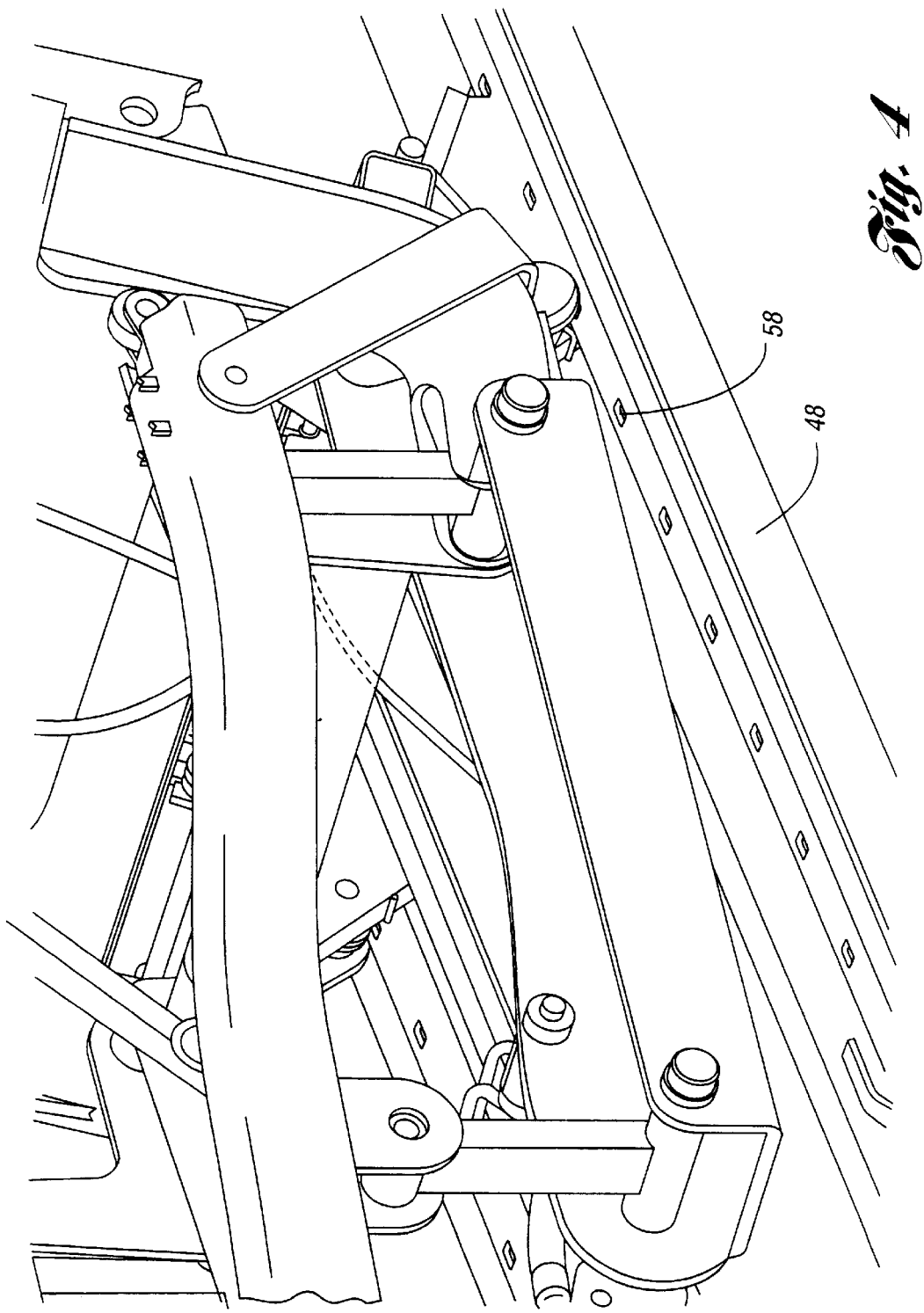
FIG. 4 is a subassembly view showing in enlarged form a portion of the parallelogram linkage structure and the roller track illustrated schematically in FIG. 1.

Pivoted on bracket 34 is a locking bracket 54' which has locking teeth 56 that are adapted to engage openings 58 formed in the upper side of the rail 48, as indicated best in FIGS. 3 and 4. Member 54' is pivoted on pivot pin 60 carried by the bracket 34. Member 54' has an arm extending upwardly, as shown at 62, which can be secured to the lower seat portion and tilted about the pivot shaft 60 when the lower seat portion is moved forward. This causes the member 54' to move so that the teeth 56 become disengaged from the openings 58 in the seat track 48. Coil spring 64 normally urges the member 54' in a clockwise direction, as viewed in FIG. 2, so that the teeth 56 become locked in the openings 58.

When the seat assembly is adjusted forward toward the foot well indicated at 66 in FIG. 1 and in FIG. 3, the adjustable legs 50 will be pivoted about pivot point 68, shown in FIG. 1 and in FIG. 3. Simultaneously, the telescopic members 52 and 54 will move as the friction lock is released. Thus, the seat assembly in its folded state may be moved forward and nested in the foot well 66. This greatly enhances the capability of the passenger compartment to carry cargo.

Figure 5:
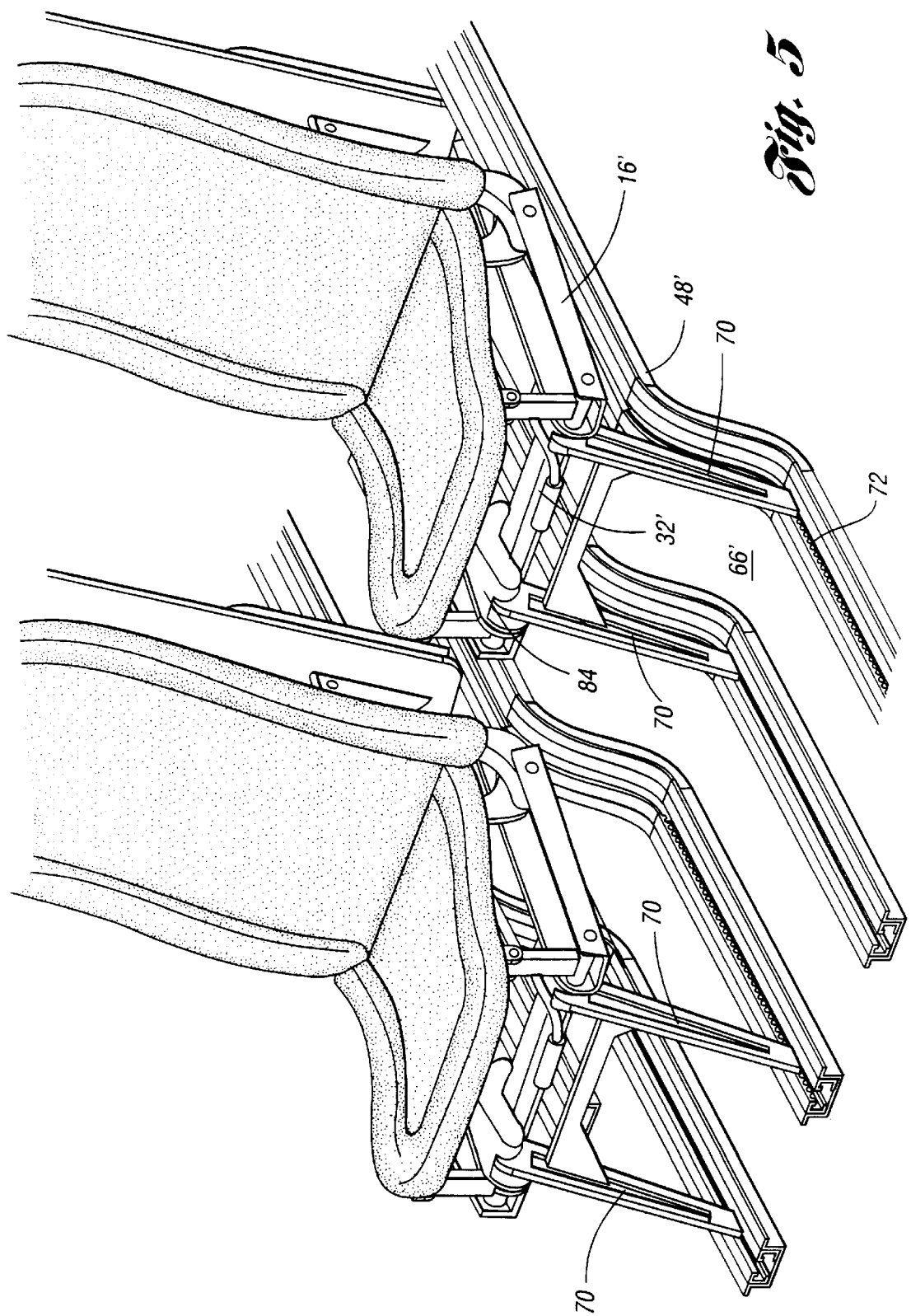
FIG. 5 is a view of a pair of seat assemblies with forward mounting legs that correspond to the adjustable legs of the embodiment of FIG. 1, but which are adapted to be folded under the lower seat portion as the seat assembly is moved forward in the mounting track.

FIG. 5 shows an alternate construction. In the embodiment of FIG. 5, the adjustable legs 50 are replaced by fixed length legs 70. The lower ends of the legs 70 are provided with locking elements that are received in locking teeth 72 formed in the seat track 48'. The upper end of each of the legs 70 is pivotally mounted on shaft 32', which corresponds to the shaft 32 of the embodiment of FIG. 2. The upper end of each leg 70 is provided with a hub 74 with internal locking teeth 76, as indicated best in FIG. 9. A locking element 78, supported on the shaft 32', is adapted to register with the hub 74. Locking element 78 is provided with external teeth 80 which register with tooth spaces for the teeth 76 when it is moved into the hub 74. Member 82, which is connected to cross-member 84 as seen in FIG. 5, is provided with a central opening in which is formed teeth 86. The tooth spaces between teeth 86 permit the external teeth 80 to pass through the member 82 and engage the tooth spaces in the hub 74. This locks the member 70 to the member 84 which is joined integrally with the lower member 16' of the linkage assembly for the riser for the lower seat portion.

When the member 78 is moved out of registry with the hub 74, the leg 70 can be rotated about the axis of shaft 32'.

Figure 9:
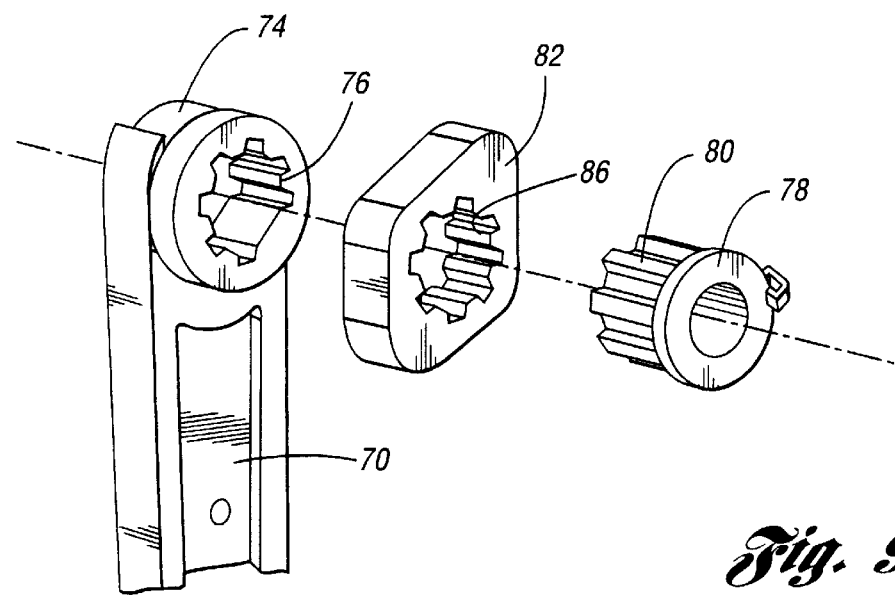
FIG. 9 shows an exploded view of the upper end of a mounting leg of the type shown in FIG. 8.

Shown in FIG. 8 is an assembly view of the structure shown in FIG. 9. A spring 88 surrounds a shaft 32' and applies a force on the member 78 tending normally to lock the leg 70 against rotation relative to the lower member of the parallelogram linkage mechanism of the riser for the lower seat portion. When the members 78 are moved against the force of the spring 88, the hubs 74 of the adjustable legs 70 become released, thereby permitting rotary motion of the legs with respect to the shaft 32'. This unlatching of the legs is accomplished by a manually operable cable assembly indicated generally at 90, as seen in FIG. 8. When the cable assembly 90 is used to exert a force opposing the force of the spring 88, the members 78 are moved out of locking engagement with their respective hubs 74.

When the seat assembly indicated in FIG. 5 is moved forward, as the rollers move along the seat track, the legs 70 can be folded under the lower seat portion as the lower seat portion enters the foot well 66' indicated in FIG. 5.

Figure 6:
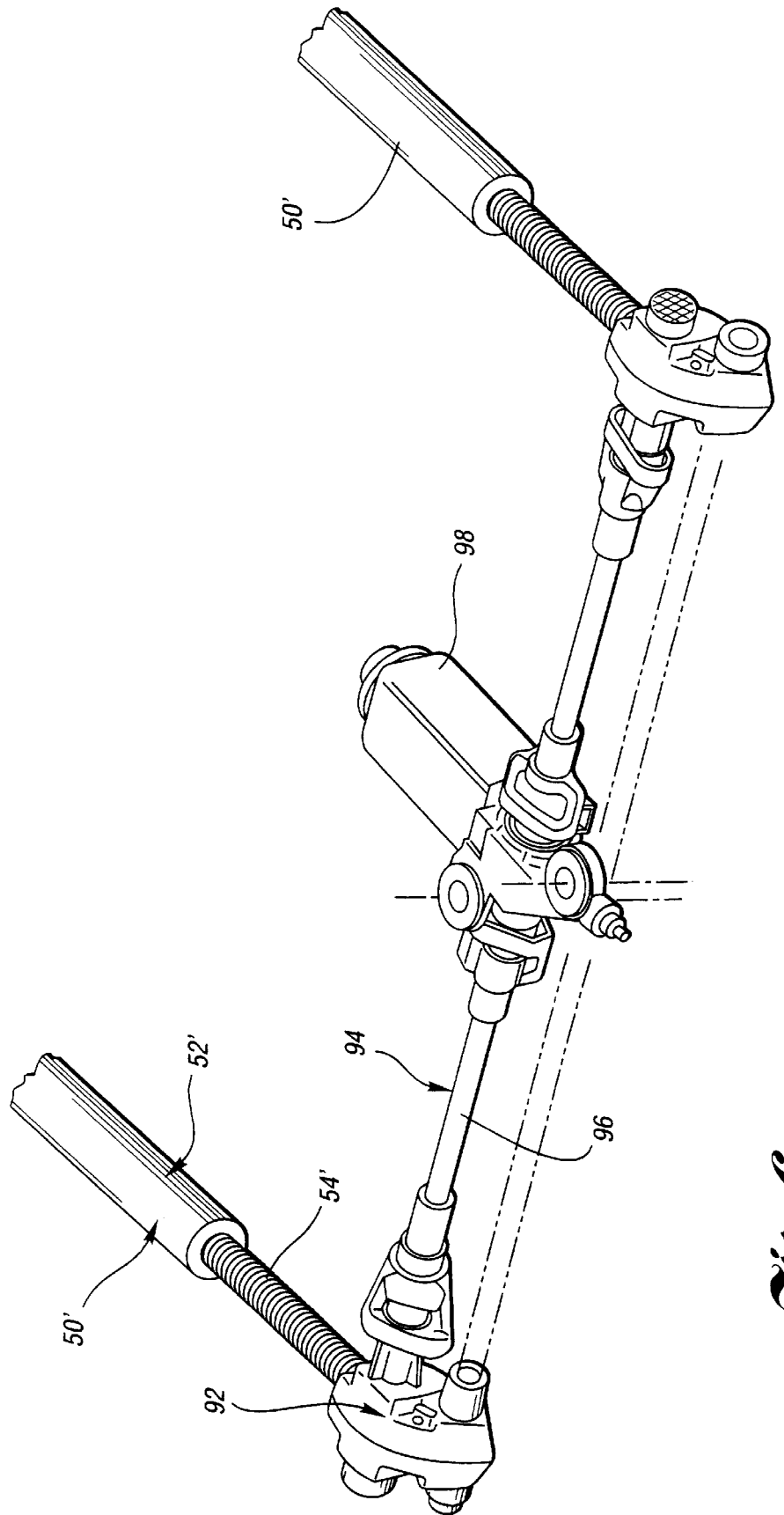
FIG. 6 shows a modified adjustable leg construction which comprises screw thread members and an electric motor for driving the screw thread members of the leg, one with respect to the other, thereby adjusting the effective length of the leg.
Figure 7:
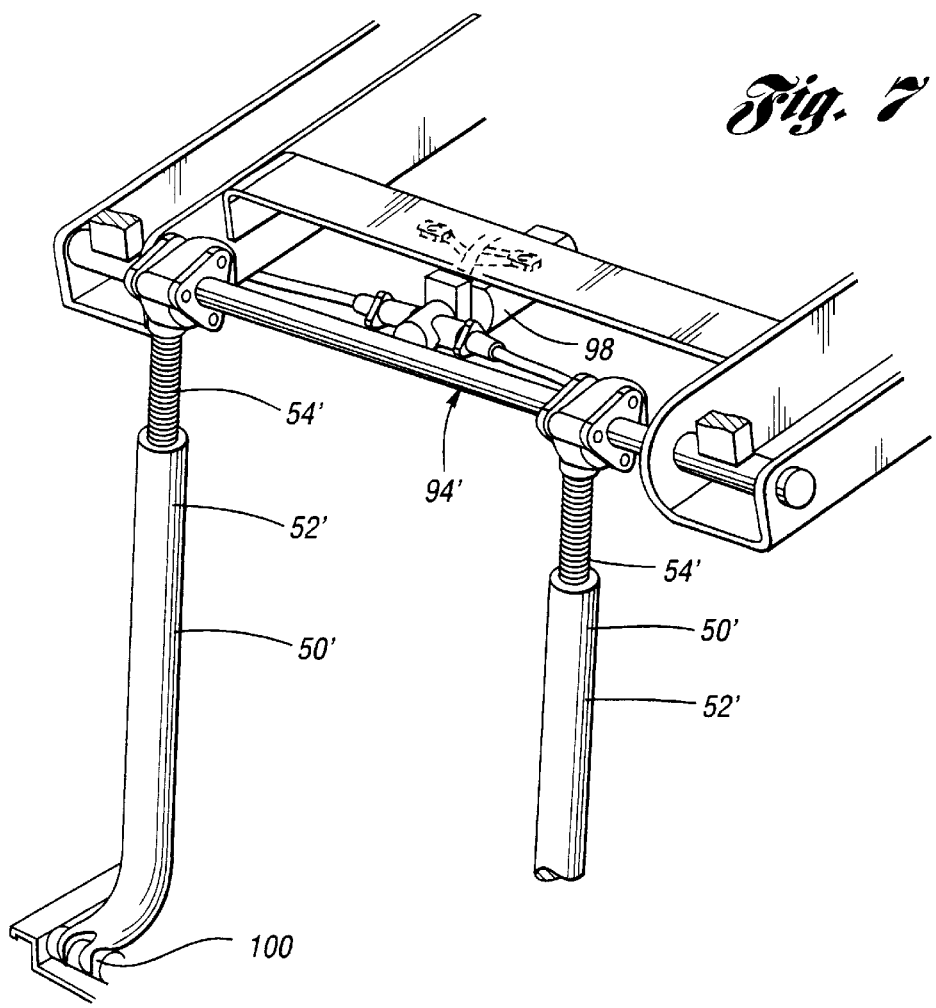
FIG. 7 is a view showing the adjustable legs of FIG. 6 assembled at the forward margin of the vehicle seat assembly.

FIGS. 6 and 7 show an alternate forward leg construction. It comprises an outer telescoping member 52' and an inner telescoping member 54'. The member 54' is provided with external threads which register with internal threads in the member 52'. When the member 54' is rotated, the effective length of the adjustable leg is either extended or retracted. The adjustable leg of FIG. 6 is indicated by reference numeral 50'.

A mechanical driving mechanism (i.e., a geared drive) for turning the screw threads of the member 54' is shown at 92. A torque input assembly for the geared drive 92 is shown at 94. It comprises a drive shaft 96 connected to the torque input element of the geared drive 92. The opposite end of the shaft 96 is connected drivably to the armature of electric motor 98. A similar drive mechanism is provided for a companion adjustable leg 50' at the opposite side of the seat assembly, as seen in FIGS. 6 and 7.

The lower end of each adjustable leg assembly 50' is pivoted on a pivot pin, as seen in FIG. 7 at 100. The pivotal connection at 100 connects the lower end of each adjustable leg 50' to the seat track.

Although the particular embodiments of the invention have been described, it is contemplated that modifications and equivalent constructions may be made by a person skilled in the art without departing from the scope of the invention.

What is claimed is:

1. A seat assembly for a passenger compartment of an automotive vehicle, the passenger compartment having a floor pan structure, the seat assembly comprising:

a seat assembly support member, a lower seat frame having forward and rearward margins and a seat back frame having a lower margin;

the rearward margin of the lower seat frame being supported by the support member, the seat back frame being pivoted at its lower margin on the support member;

the support member being adapted to be mounted on the floor pan structure for linear movement in a fore-and-aft direction;

a leg pivotally secured at one end thereof to the forward margin of the lower seat frame;

the floor pan structure having a first platform portion in a first plane for supporting the support member and a second platform portion in a second plane, the second plane being below the first plane to define a foot well;

the leg being adapted to be pivotally secured at the other end thereof to the floor pan structure in the foot well;

and guide rollers on the support member for engaging the first platform portion whereby the leg pivots about its other end as the seat assembly moves in a forward direction as the support member is guided on the floor pan structure into the foot well, the seat back frame being foldable about the rearward margin of the lower seat frame whereby the seat assembly is adapted to be received in the foot well.

2. The seat assembly set forth in claim 1 wherein the floor pan structure has a guide groove extending in a fore-and-aft direction along the first platform portion toward the foot well, the support member having rollers engageable with the guide groove whereby the seat assembly is adjustable in the fore-and-aft direction as the leg pivots about its other end.

3. The seat assembly as set forth in claim 2 wherein the leg comprises relatively adjustable leg members, one leg member being adjustable relative to the other to effect a change in the effective length of the leg as the seat assembly is moved into and out of the foot well.

4. The seat assembly set forth in claim 1 wherein the leg comprises relatively adjustable leg members, one leg member being adjustable relative to the other to effect a change in the effective length of the leg as the seat assembly is moved into and out of the foot well.

5. The seat assembly set forth in claim 4 wherein the support member includes a latch means for releasably locking the seat assembly to the floor pan structure.

6. The seat assembly set forth in claim 4 wherein the leg members are telescoped, one within the other on a common axis, and means for locking one leg member within the other to provide load support for the forward margin of the lower seat frame.

7. The seat assembly as set forth in claim 6 wherein the telescoped leg members are threadably connected together, and means for rotating one leg member about the common axis to effect a change in the length of the leg.

* * * * *